United States Patent Office.

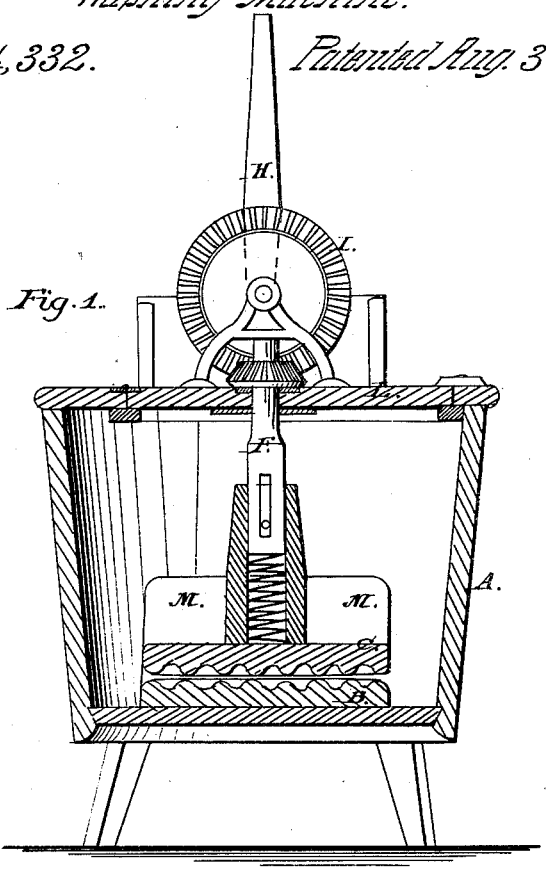

J. W. MYERS, OF LYONS, IOWA.

Letters Patent No. 94,332, dated August 31, 1869.

---

IMPROVED WASHING-MACHINE.

---

The Schedule referred to in these Letters Patent and making part of the same.

---

*To all whom it may concern:*

Be it known that I, J. W. MYERS, of Lyons, in the county of Clinton, and State of Iowa, have invented a new and improved Washing-Machine; and I do hereby declare that the following is a full, clear, and exact description thereof, which will enable others skilled in the art to make and use the same, reference being had to the accompanying drawing, forming part of this specification.

The object of this invention is to provide a simple, cheap, and efficient washing-machine, for washing clothes.

It consists in an arrangement of horizontal grooved rubbing-disks, a tub, and operating-mechanism, all as hereinafter more fully specified.

Figure 1 represents a sectional elevation of my improved machine.

Figure 2 represents a face view of one of the rubbing-disks.

Similar letters of reference indicate corresponding parts.

Within a suitable tub, A, preferably supported on legs, or otherwise, above the floor, I provide a fixed rubbing-disk, B, having a grooved face, D, the said grooves being arranged in parallel groups or sections E, giving to the ridges formed thereby directions oblique to the centre.

In the lower rubber these ridges and grooves are pitched in one direction, and those in the upper rubber C are pitched in the opposite direction.

The rubber C is suspended from a vertical shaft, F, by a jointed connection, and capable of sliding up and down thereon to some extent, and it is provided with a spiral spring, G, to press it down upon the clothes to be placed between the two rubbers. The arrangement is such that the two rubbers cannot be forced quite together.

A suitable space is provided between the rubbers and the wall of the tub, to facilitate the application and removal of the clothes.

Rotary motion is imparted to the upper rubber by the vibrating hand-lever H and wheels I and K, whereby the clothes are rubbed between the said rubbers B and C, as they are revolved first one way and then the other.

The clothes are prevented from being discharged from the rubbers, under these reverse motions, by the opposing action of the grooves and projections, which are pitched in opposite directions, as above stated.

The upper rubber-shaft is supported in bearings on the cover L, so that when the latter is raised, the said rubber will be elevated from the tub.

The upper disk is provided with agitating-blades M, for imparting great agitation to the water.

Having thus described my invention,

What I claim as new, and desire to secure by Letters Patent, is—

1. The combination of rubbers B C, agitators M M, tub A, shaft F, and driving-gears I K, as shown and described.

2. The combination, with a rotating rubber, of one or more agitators M, as and for the purpose specified.

The above specification of my invention signed by me, this 3d day of April, 1869.

J. W. MYERS.

Witnesses:
GEORGE ALLEN,
STEPHEN BRIGGS.